(12) United States Patent
Omori et al.

(10) Patent No.: US 11,554,697 B2
(45) Date of Patent: Jan. 17, 2023

(54) METHOD FOR ASSEMBLING VEHICLE SEAT WITH CUSHION PLATE

(71) Applicant: TS TECH CO., LTD., Saitama (JP)

(72) Inventors: Misao Omori, Tochigi (JP); Kenichi Niitsuma, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/358,070

(22) Filed: Jun. 25, 2021

(65) Prior Publication Data

US 2021/0316643 A1    Oct. 14, 2021

Related U.S. Application Data

(60) Continuation of application No. 16/284,063, filed on Feb. 25, 2019, now Pat. No. 11,046,219, which is a (Continued)

(30) Foreign Application Priority Data

Oct. 28, 2004 (JP) .................................. 2004-313623

(51) Int. Cl.
  B60N 2/427   (2006.01)
  B60N 2/66    (2006.01)
  (Continued)

(52) U.S. Cl.
  CPC ........... B60N 2/427 (2013.01); B60N 2/4228 (2013.01); B60N 2/66 (2013.01); B60N 2/667 (2015.04);
  (Continued)

(58) Field of Classification Search
  CPC .... B60N 2/4885; B60N 2/4228; B60N 2/427; B60N 2/68; B60N 2/865
  (Continued)

(56) References Cited

U.S. PATENT DOCUMENTS 4,632,454 A   12/1986   Naert
5,076,643 A   12/1991   Colasanti et al.
(Continued)

FOREIGN PATENT DOCUMENTS

JP    07-075608 A   3/1995
JP    10-138811 A   5/1998
(Continued)

*Primary Examiner* — Sarah B McPartlin
(74) *Attorney, Agent, or Firm* — Michael Best & Friedrich LLP

(57) ABSTRACT

A method of assembling a vehicle seat is provided, comprising: providing a seat back frame; forwardly movably connecting a headrest for supporting a head of a seat occupant to the seat back frame; mounting a rear-end collision detector to the seat back frame at a position behind the seat occupant, operatively connecting the rear-end collision detector to the headrest; disposing a link member at a position lateral to the rear-end collision detector; forming a front extending portion that inwardly extends in a right-to-left direction at a front end of a lateral face of the side frame; and forming a rear extending portion that inwardly extends in the right-to-left direction; wherein a protruding portion is formed from a portion of the lateral face of the side frame that faces at least the part of the bracket, the link support shaft being disposed at a same height as the protruding portion.

11 Claims, 8 Drawing Sheets

Related U.S. Application Data continuation of application No. 15/149,273, filed on May 9, 2016, now Pat. No. 10,214,123, which is a division of application No. 14/201,056, filed on Mar. 7, 2014, now Pat. No. 9,333,886, which is a division of application No. 13/851,840, filed on Mar. 27, 2013, now Pat. No. 8,678,495, which is a division of application No. 13/364,819, filed on Feb. 2, 2012, now Pat. No. 8,444,219, which is a division of application No. 13/106,266, filed on May 12, 2011, now Pat. No. 8,132,857, which is a division of application No. 12/707,095, filed on Feb. 17, 2010, now Pat. No. 7,963,599, which is a division of application No. 11/718,309, filed as application No. PCT/JP2005/019937 on Oct. 28, 2005, now Pat. No. 7,967,380.

(51) Int. Cl.
  *B60N 2/888* (2018.01)
  *B60N 2/865* (2018.01)
  *B60N 2/42* (2006.01)
  *B60N 2/68* (2006.01)

(52) U.S. Cl.
  CPC ............ *B60N 2/6671* (2015.04); *B60N 2/68* (2013.01); *B60N 2/865* (2018.02); *B60N 2/888* (2018.02); *Y10T 29/49826* (2015.01)

(58) Field of Classification Search
  USPC .................. 297/216.1, 216.12, 284.4, 284.7
  See application file for complete search history.

(56) References Cited

U.S. PATENT DOCUMENTS

| | | | |
|---|---|---|---|
| 5,795,019 A | 8/1998 | Wieclawski | |
| 6,139,102 A | 10/2000 | von Moller | |
| 6,250,714 B1 | 6/2001 | Nakano et al. | |
| 6,260,921 B1 | 7/2001 | Chu et al. | |
| 6,273,511 B1 | 8/2001 | Wieclawski | |
| 6,375,262 B1 | 4/2002 | Watanabe | |
| 6,523,892 B1 | 2/2003 | Kage et al. | |
| 6,568,753 B1 | 5/2003 | Watanabe | |
| 6,702,377 B2 | 3/2004 | Nakano | |
| 6,783,177 B1 | 8/2004 | Nakano | |
| 6,789,845 B2 | 9/2004 | Farquhar et al. | |
| 6,789,846 B2 | 9/2004 | Humer et al. | |
| 6,918,633 B2 | 7/2005 | Forkel et al. | |
| 6,955,397 B1 | 10/2005 | Humer | |
| 7,044,544 B2 | 5/2006 | Humer et al. | |
| 7,052,057 B2 | 5/2006 | McMillen | |
| 7,077,472 B2 | 7/2006 | Steffens, Jr. | |
| 7,104,602 B2 | 9/2006 | Humer et al. | |
| 7,118,174 B2 | 10/2006 | Lee | |
| 7,270,374 B2 | 9/2007 | Moriggi | |
| 7,393,052 B2 | 7/2008 | Humer et al. | |
| 7,540,562 B2 * | 6/2009 | Sekida .................. | B60N 2/888 297/216.12 |
| 7,644,987 B2 | 1/2010 | Humer et al. | |
| 7,677,659 B2 | 3/2010 | Humer et al. | |
| 8,287,039 B2 | 10/2012 | Akutsu | |
| 8,313,140 B2 | 11/2012 | Niitsuma et al. | |
| 2009/0001785 A1 | 1/2009 | Swan et al. | |
| 2010/0066135 A1 | 3/2010 | Humer et al. | |

FOREIGN PATENT DOCUMENTS

| | | |
|---|---|---|
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2003-341401 A | 12/2003 |

* cited by examiner

METHOD FOR ASSEMBLING VEHICLE SEAT WITH CUSHION PLATE

CROSS-REFERENCE TO RELATED APPLICATIONS

This application is a continuation application of U.S. patent application Ser. No. 16/284,063, filed Feb. 25, 2019, which is a continuation application of U.S. Pat. No. 10,214,123, filed May 9, 2016, which is a divisional application of U.S. Pat. No. 9,333,886, filed Mar. 7, 2014, which is a divisional application of U.S. Pat. No. 8,678,495, filed Mar. 27, 2013, which is a divisional application of U.S. Pat. No. 8,444,219, filed Feb. 2, 2012, which is a divisional application of U.S. Pat. No. 8,132,857, filed May 12, 2011, which is a divisional application of U.S. Pat. No. 7,963,599, filed Feb. 17, 2010, which is a divisional application of U.S. Pat. No. 7,967,380, filed Nov. 21, 2007, which is a PCT national stage entry of international patent application no. PCT/JP2005/19937, filed Oct. 28, 2005, which claims the foreign priority benefit of Japanese patent application no. JP2004-313623, filed Oct. 28, 2004. The contents of these applications are herein incorporated by reference.

TECHNICAL FIELD

The present invention relates to a method for assembling vehicle seat, and particularly a vehicle seat having a cushion plate with a pressure adjusting mechanism.

BACKGROUND

A conventional seat back cushion for a vehicle seat is resiliently supported by means of a number of seat springs which are located between side frames of a seat back frame. The seat springs generally comprise zigzag springs or formed wire springs.

The degree of bending of the seat springs locally vary depending on the magnitude of load imparted. The springs located in the upper and lower portions of the seat back frame are more bent than those located in the central portion of the seat back frame. Even in one spring, the central part of the spring is more bent than the right and left side parts of the spring. Thus, the degree of bending of the springs are locally varied. This brings about deterioration of the stability and comfort of the seat when a person sits on the seat.

Japanese Patent Application Laid-Open No. 11-206506 discloses a structural arrangement where an auxiliary plate, which is forwardly and rearwardly movable, is provided in connection with the cushion plate.

The auxiliary plate disclosed in Japanese Patent Application Laid-Open No. 11-206506 is integrally formed at the central part of the cushion plate, and the cushion plate is disposed only around the auxiliary plate. Therefore, the cushion plate disposed around the auxiliary plate fails to exhibit its function as the mechanism for resiliently supporting the seat back cushion. This means that a load of the seated person is focused on the auxiliary plate and is not effectively dispersed in the cushion plate.

Also in the conventional technique, it is difficult to provide both of a pressure adjusting mechanism of the cushion plate and an active headrest mechanism for moving the headrest to the front when the vehicle rear-end collision occurs in the seat back. In other words, the pressure adjusting mechanism lowers a sensitivity of a collision detector of the active headrest mechanism, and hence, it is difficult to coexistently provide both of the mechanisms.

SUMMARY

Disclosed herein is a method to assemble a vehicle seat having a cushion plate with a pressure adjusting mechanism which is able to support the seated person while effectively dispersing the load of the seated person.

In an embodiment, a method is disclosed for assembling a vehicle seat having a cushion plate with a pressure adjusting mechanism and an active headrest mechanism for moving the headrest to the front when the vehicle rear-end collision occurs.

In more detail, various embodiments of the invention provide a method of assembling a vehicle seat, comprising: providing a seat back frame; forwardly movably connecting a headrest for supporting a head of a seat occupant to the seat back frame; mounting a rear-end collision detector to the seat back frame at a position behind the seat occupant, wherein the rear-end collision detector detects rearward movement of the seat occupant and is movable rearward; operatively connecting the rear-end collision detector to the headrest such that the rearward movement of the rear-end collision detector forwardly moves the headrest; disposing a link member at a position lateral to the rear-end collision detector; mounting a bracket to a side frame that constitutes a side portion of the seat back frame; mounting a link support shaft to the bracket, with the link member being mounted to the link support shaft; forming a front extending portion that inwardly extends in a right-to-left direction and is formed at a front end of a lateral face of the side frame; and forming a rear extending portion that inwardly extends in the right-to-left direction and is formed at a rear end of the lateral face of the side frame; wherein: at least a part of the bracket is disposed on the lateral face of the side frame and between the front extending portion and the rear extending portion; a protruding portion inwardly protruding is formed from a portion of the lateral face of the side frame that faces at least the part of the bracket, the link support shaft being disposed at a same height as the protruding portion; and at least the part of the bracket is directly attached to the integrally formed protruding portion.

BRIEF DESCRIPTION OF THE DRAWINGS

The following drawings illustrate an embodiment of the invention that is described in more detail below.

DETAILED DESCRIPTION OF THE EMBODIMENTS

Figure 1:
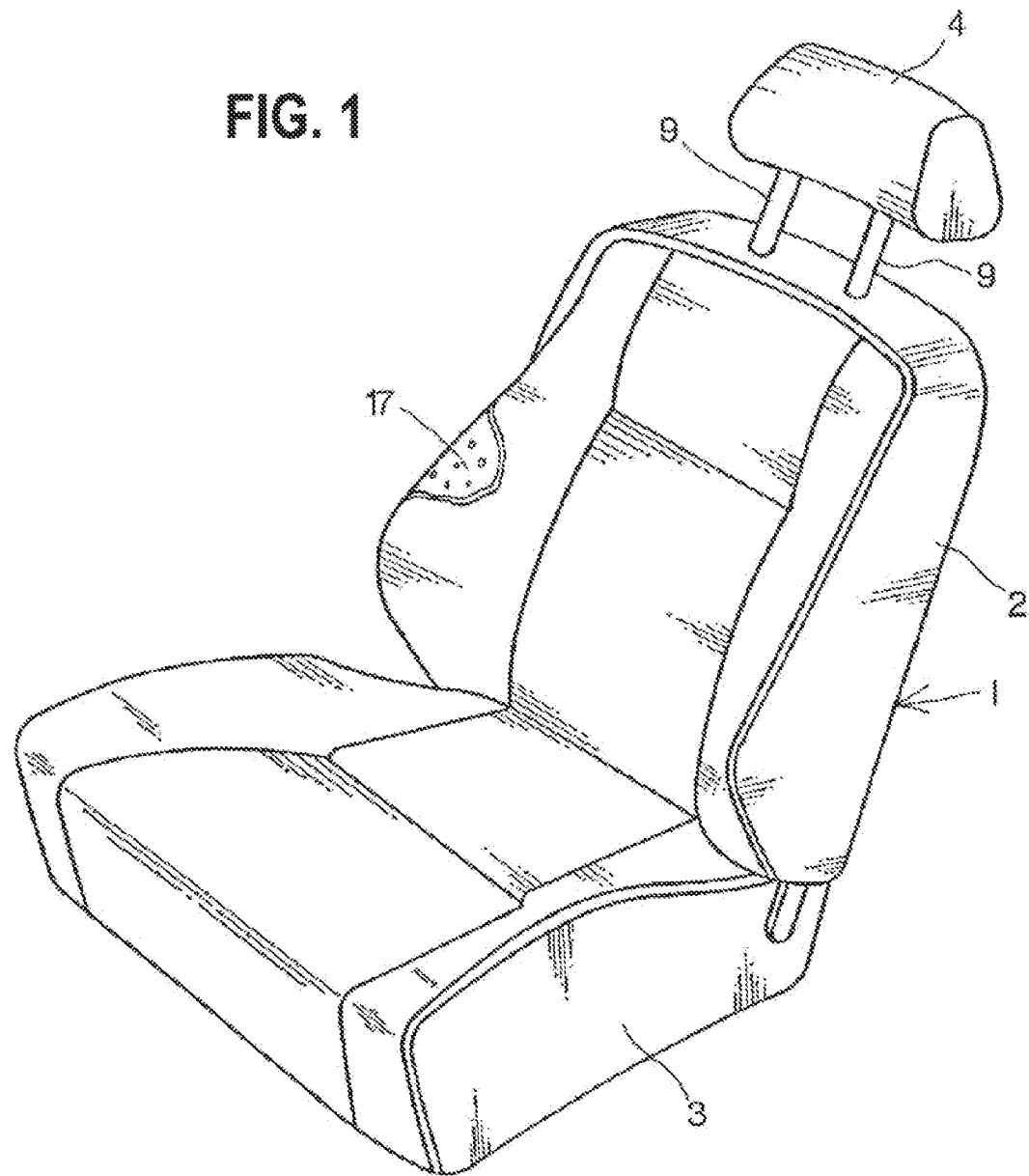
FIG. 1 is a perspective view showing a vehicle seat.
Figure 2:
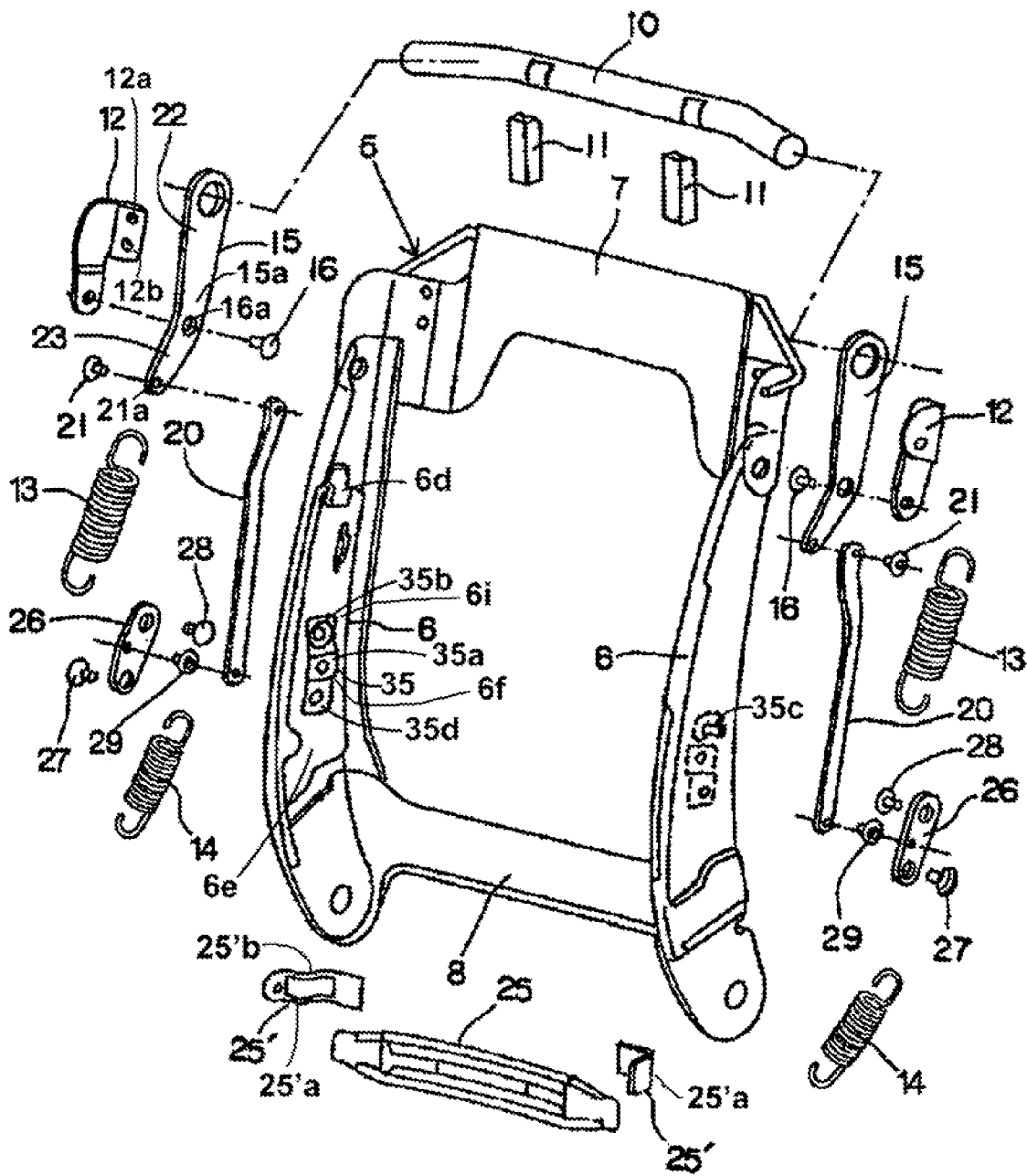
FIG. 2 is an exploded perspective view showing a seat back frame of the vehicle seat and basic components of an active headrest mechanism.
Figure 3:
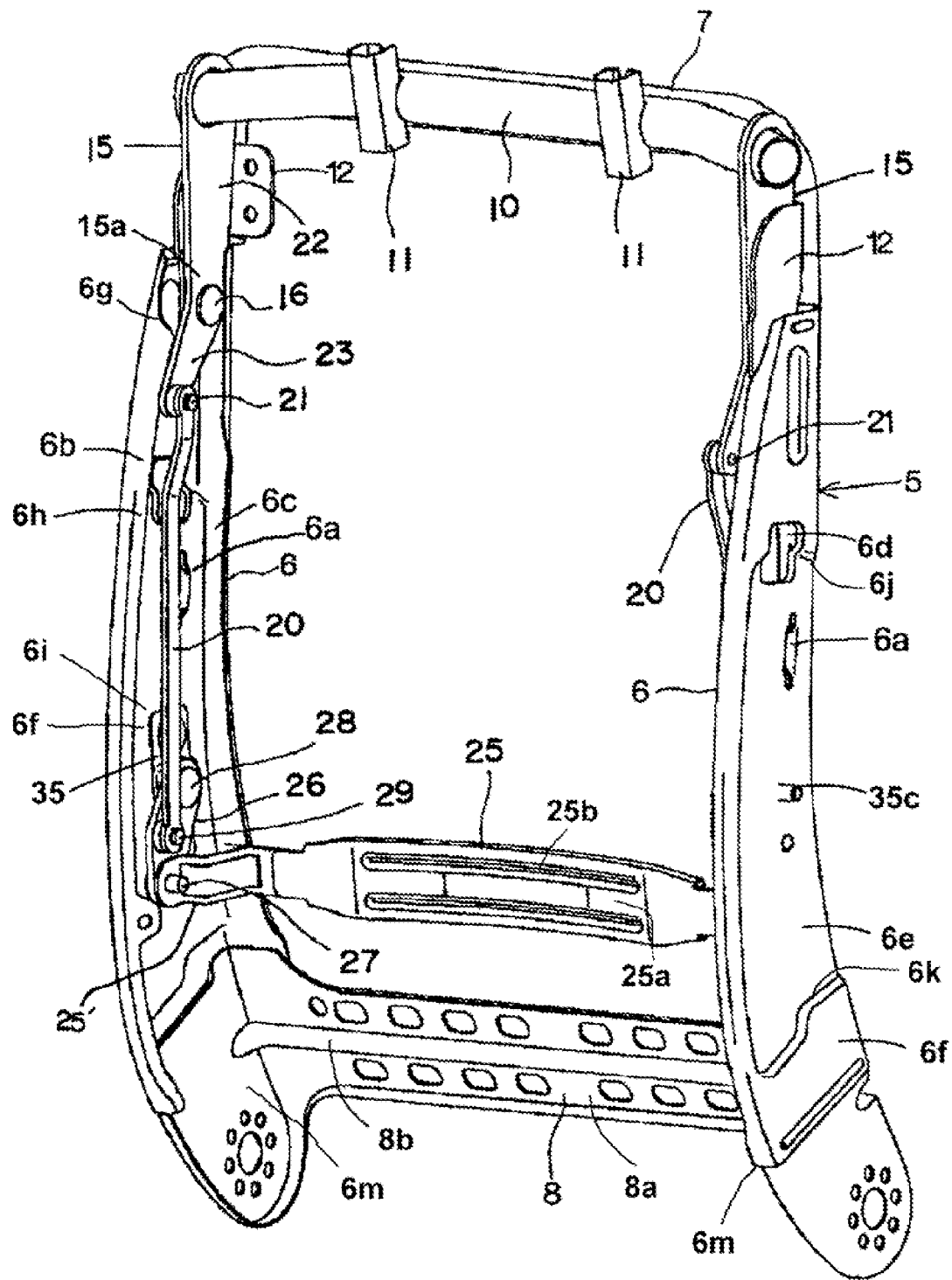
FIG. 3 is a perspective view showing an assembly of the components shown in FIG. 2.
Figure 4:
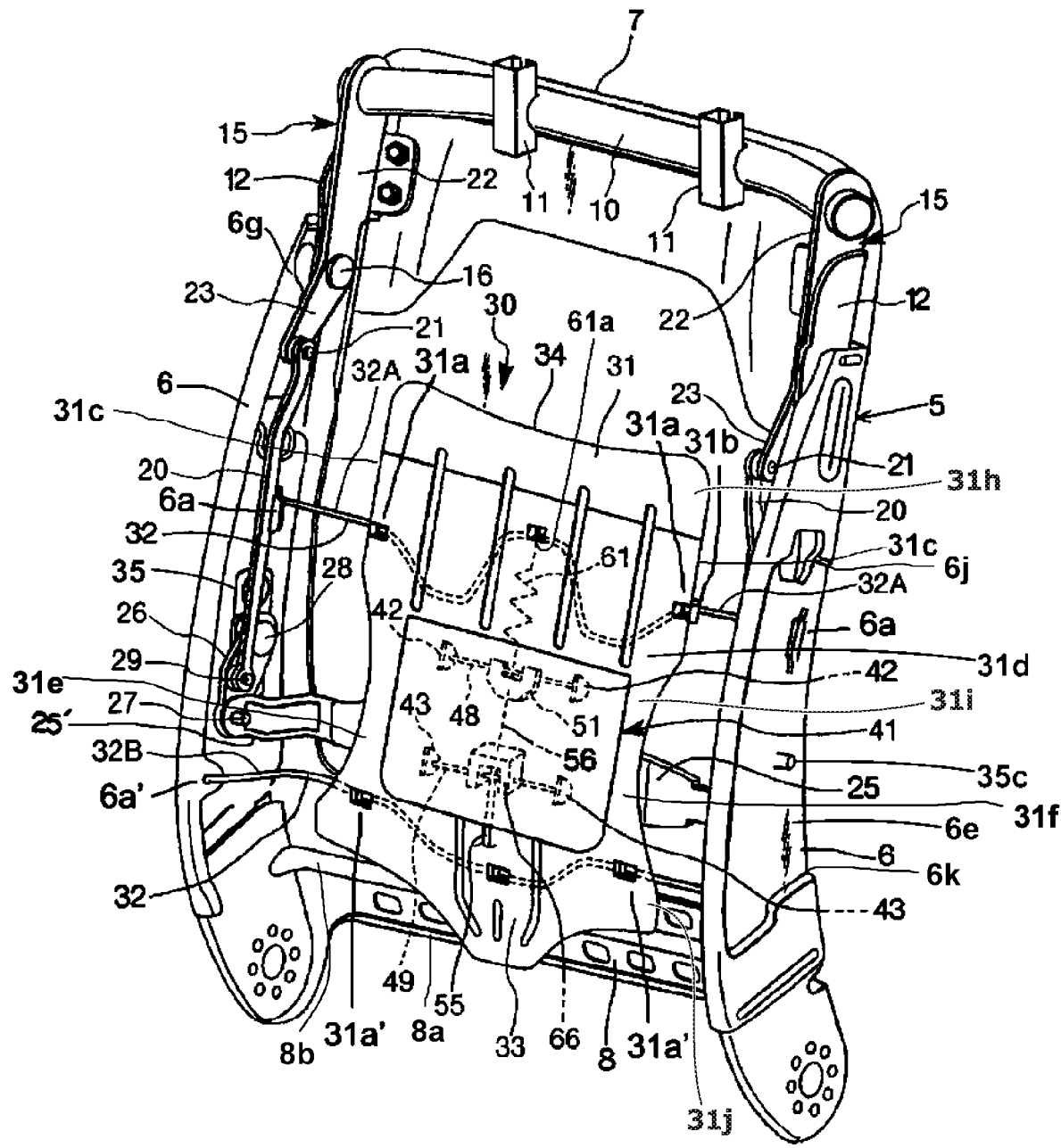
FIG. 4 is a perspective view showing a state that a cushion plate and an auxiliary plate are mounted to the assembly of FIG. 3.

An embodiment of the present invention will be described with reference to the accompanying drawings. Referring to FIGS. 1-4, a vehicle seat 1 of the present invention has a seat back 2, a seat bottom 3 and a headrest 4 provided at the top of the seat back 2. Referring to FIGS. 2 and 3, a seat back frame 5 of the seat back 2 includes a pair of side frames 6, an upper frame 7 and a lower frame 8 having a connecting plate 8a and a projecting curve portion 8b, the lower frame having a substantial rectangular shape.

A headrest support (or "lateral member" or "right-to-left extending member") 10 is arranged near the upper frame 7. The support 10 horizontally extends and is movable with respect to the seat back frame 5. Lower parts of pillars 9 of the headrest 4 are inserted into vertical engaging parts (first/second pillar insertion portions) 11 which are fixed to the headrest support 10. The pillars 9 are vertically adjustable with the aid of the vertical engaging parts 11.

Upper brackets 12 are fixed to the side frames 6, respectively. The frames 6 comprise a front projecting wall (front extending portion) 6b, a rear projecting wall (rear extending portion) 6c, an opening 6d, an inwardly protruding/side projecting portion 6e, a lateral face 6f, a concave portion 6g, which may be a cutout portion formed at a portion of an inner end portion 6h of the front projecting wall (front extending portion) 6b of the side frame 6 that faces at least a part of the bracket 12, where the concave portion 6g is disposed at a position facing a link support shaft 16. The frames 6 also comprise a support member attachment portion 6i, a first step portion 6j, a second step portion 6k, and a lower side frame portion 6m.

Figure 5:
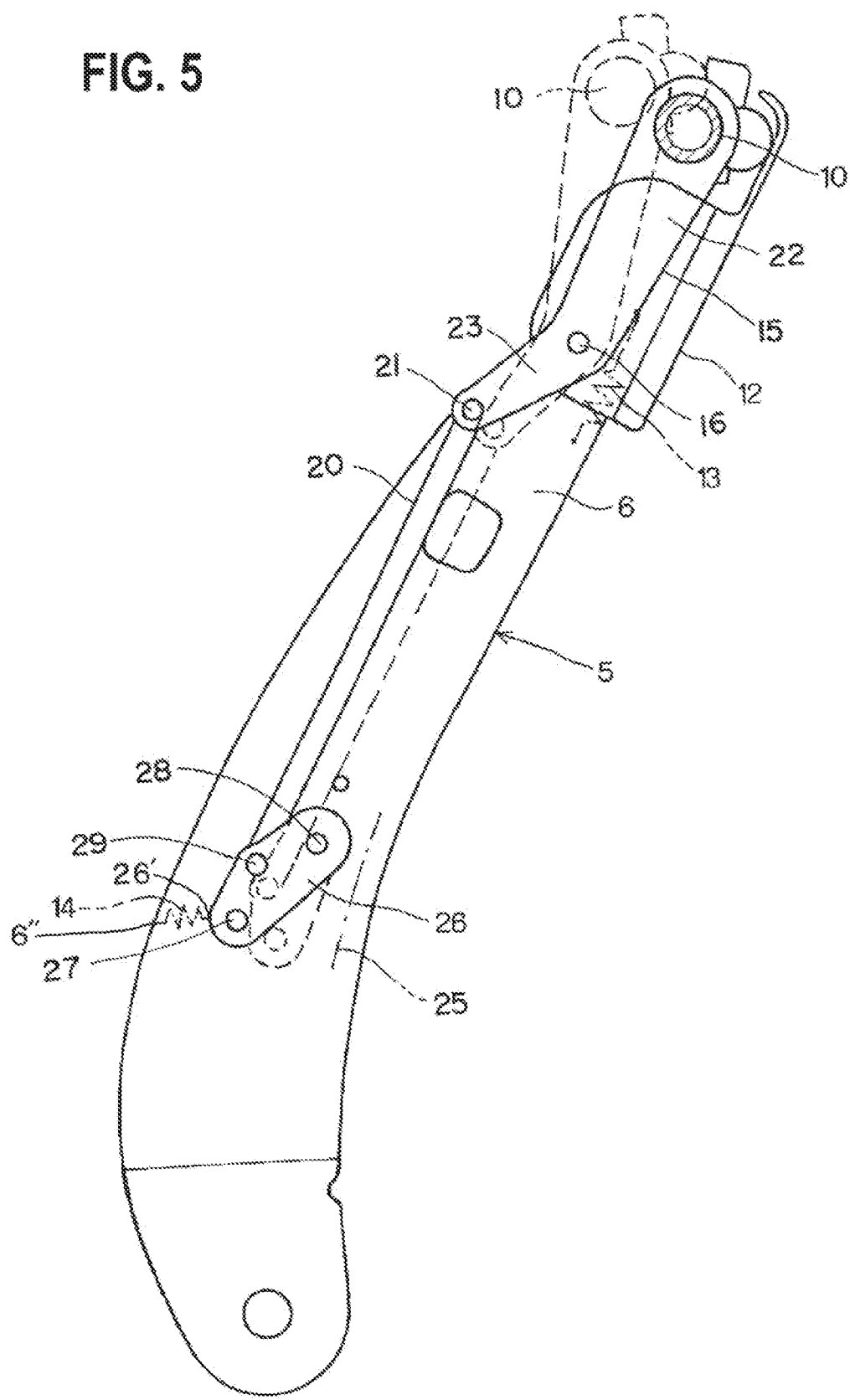
FIG. 5 is a side view showing a side frame of the seat back frame and the basic components of the active headrest mechanism.
Figure 6:
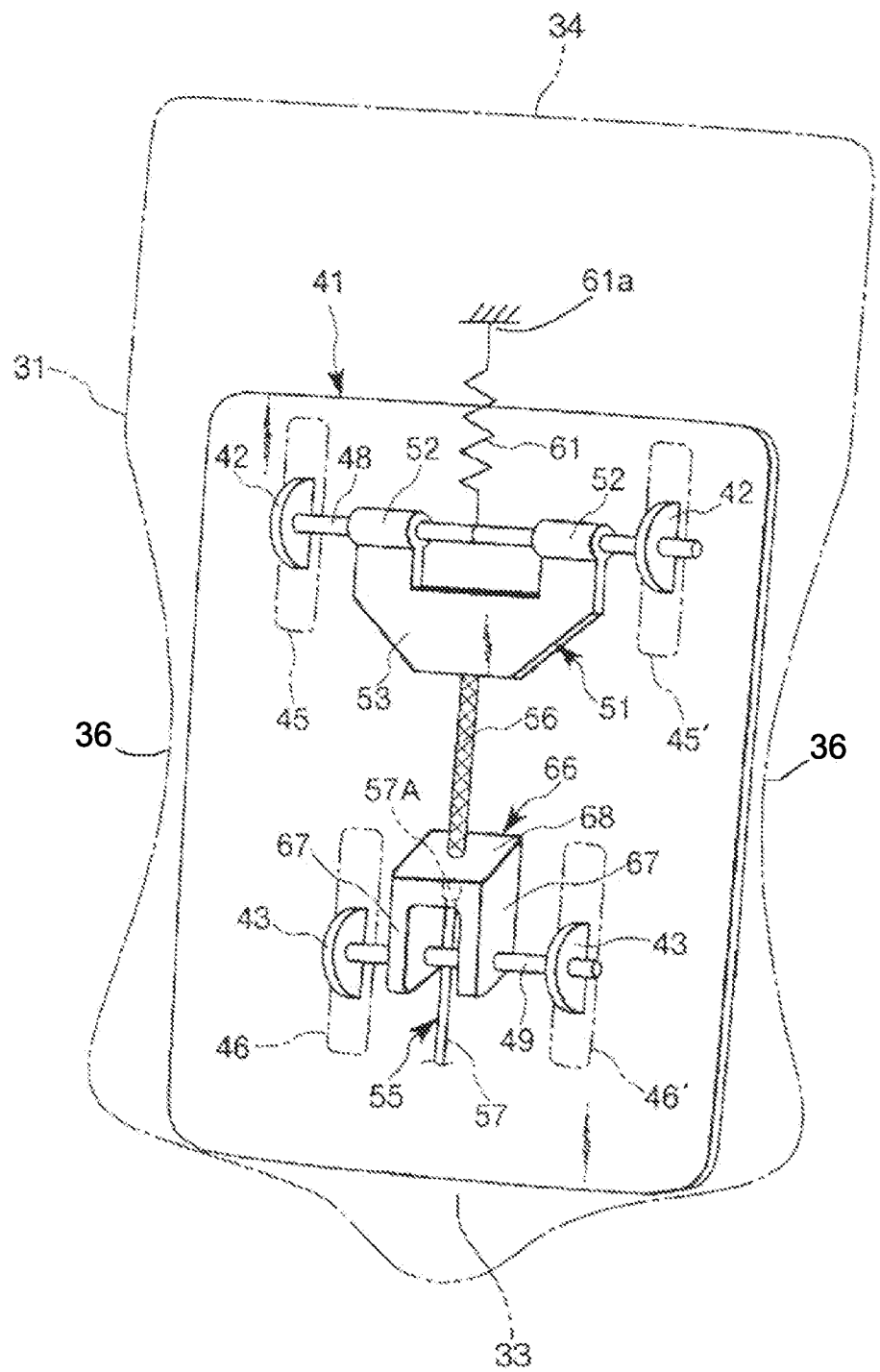
FIG. 6 is a perspective view showing the back sides of the cushion plate and the auxiliary plate.

An upper link (link member) or bell crank 15 is rotatably mounted to each upper bracket 12 by a shaft 16 that protrudes through a first hole 16a of the upper link 15 at a link support portion 15a. Each upper link 15 includes an upper long arm 22 extending upward and a lower short arm 23 extending downwardly and to the front side. The upper link 15 is urged by resiliency of an upper spring 13 clockwise, as shown in FIG. 5. The upper spring 13 includes a first end coupled to the upper link 15 and a second end coupled to the side frame 6. The right and left ends of the headrest support 10 are coupled to the upper arms 22, respectively. Each lower arm 23 is axially fixed to the upper part of a longitudinally extending coupling (or load transmission) rod 20 by way of a pin 21 that extends through a second hole 21a of the upper link 15.

The upper link 15 is normally held at a position indicated by a solid line in FIG. 5 by the resiliency of the upper spring 13 or the like, whereby the headrest 4 is also held at a normal position. However, when the upper link 15 is rotated counterclockwise toward a position indicated by a dotted line, the headrest support 10 forwardly moves and the headrest 4 is pushed to the front.

A horizontally extending vehicle rear-end collision detector (connecting plate member) 25 is arranged between the side frames 6, 6. The collision detector 25 comprises a contact portion 25a and a reinforcing portion 25b (bead). When a rear-end collision occurs and the vehicle seat 1 relatively moves forward against the vehicle seat occupant T (FIG. 7), the collision detector 25 (FIGS. 3, 4) moves rearward by being pushed by the seat occupant T. Both ends of the collision detector 25 are coupled to lower links 26, 26 by way of pins 27, 27 (also "swinging shaft" or "connecting shaft") which are axially fixed to the side frames 6, 6 by link support shafts 28, 28, via connecting members (extending portion of the connecting plate member) 25', 25' respectively. A lower bracket 35 is provided having a link shaft supporting face 35a, a first attachment portion 35b, and a second attachment portion 35d. The lower bracket 35 may attach via a bracket attachment portion 35c. The connecting members 25' each comprise a bend portion 25'a and a strengthening portion 25'b. The lower part of the coupling rod 20 is coupled to the lower link (link member) 26 by way of a pin 29. As shown in FIG. 5, one end of a lower spring (biasing member) 14 is coupled to the lower link 26 at a first biasing member engagement portion 26', while the other end thereof is coupled to the side frame 6 at a second biasing member engagement portion 6", whereby the lower links 26 are urged counterclockwise. As a result, the collision detector 25 is held at a normal position, located in the front side.

When a rear-end collision occurs, the vehicle rear-end collision detector 25 is pushed by the seat occupant T to move rearward and to turn the lower links 26 counterclockwise in FIG. 5 and to lower the coupling rod 20. At this time, a distance between the pin 29 and the shaft 28 is shorter than a distance between the pin 27 and the shaft 28, so that a backward movement of the collision detector 25 is efficiently transmitted to the coupling rod 20. A downward movement of the rod 20 rotates the upper link 15 counterclockwise so that the headrest support 10 moves forward. The upper arm 22 of the upper link 15 is longer than the lower arm 23 so that the downward movement of the coupling rod 20 efficiently causes the headrest support 10 to move forward. The forward movement of the headrest support 10 pushes the headrest 4 to the front, thereby protecting a head (neck) of the seat occupant T at the time of the rear-end collision.

The side frames 6 are formed with a metal plate having a predetermined width as viewed in the front-and-back direction. A transmission mechanism for transmitting a backward movement of the vehicle rear-end collision detector 25 to the headrest support 10 is located at a position near the side frames 6. Accordingly, a cushion 17 of the seat back 2 does not interfere with a motion of the transmission mechanism. A mechanism ranging from the collision detector 25 to the headrest support 10 forms an active headrest mechanism.

A flexible plate member 30 comprises a flexible cushion plate (resin plate member) 31 and a flexible auxiliary plate (protruding curvature portion) 41. The flexible cushion plate 31 is arranged inside the seat back frame 5. The cushion plate 31 is preferably made of synthetic resin such as polypropylene, and is substantially a single rectangular plate. The cushion plate 31 is attached to seat springs 32 such as zigzag springs or formed wire springs at mounting portions (wire engagement portions) (first wire coupling portion) 31a, (second wire coupling portion) 31a' that may include a rearward projecting portion 31b. The cushion plate 31 has a first plate portion 31d as well as a first contact portion 31e and a second contact portion 31f. The seat springs 32 include at least an upper seat spring (wire member, first wire member) 32A and a lower seat spring (second wire member) 32B, the lower seat spring 32B being attached to the cushion plate 31 at a mounting portion 31a' within a protruding portion 31c, and to the side frame 6 at a wire spring engagement portion 6a'. The seat springs 32 horizontally extend and are respectively coupled to the side frames 6 of the seat back frame 5 at wire spring engagement portions 6a, 6a'. The seat back cushion 17 is provided in front of the cushion plate 31. The cushion plate 31 comprises an offset portion 36.

When the flexible cushion plate 31 receives a load from the seat occupant T, the cushion plate 31 moves rearward against the elasticity of the seat springs 32 and flexibly supports the seat occupant T. The cushion plate 31 supports the seat back cushion 17 in "plane". Therefore, the cushion plate makes the seat occupant T feel more stable and comfortable than the conventional one in which the seat back cushion 17 is supported by only the seat springs 32.

Figure 7:
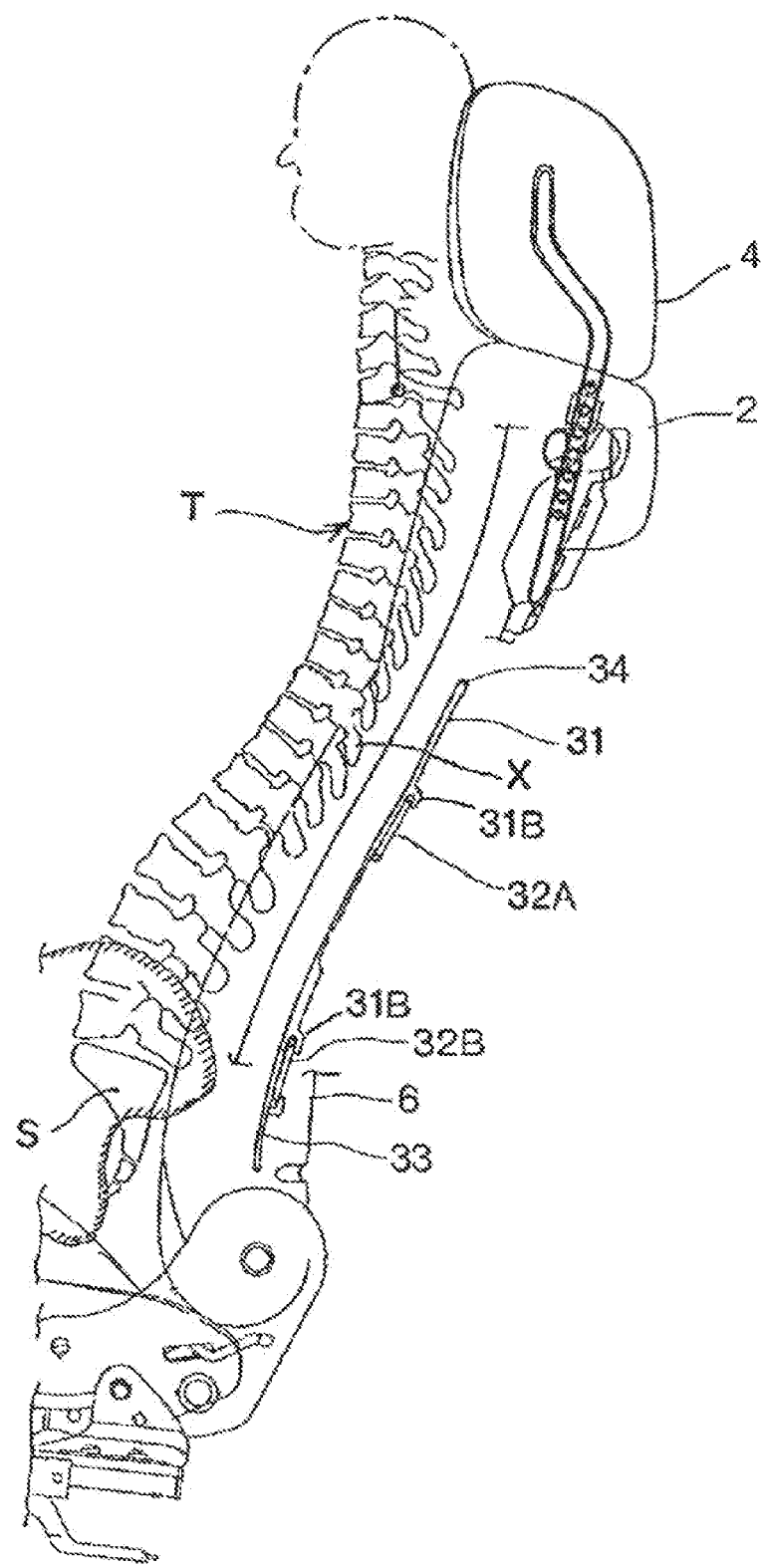
FIG. 7 is a side view showing a relationship between a part of skeleton of a seated person and the cushion plate.
Figure 8:
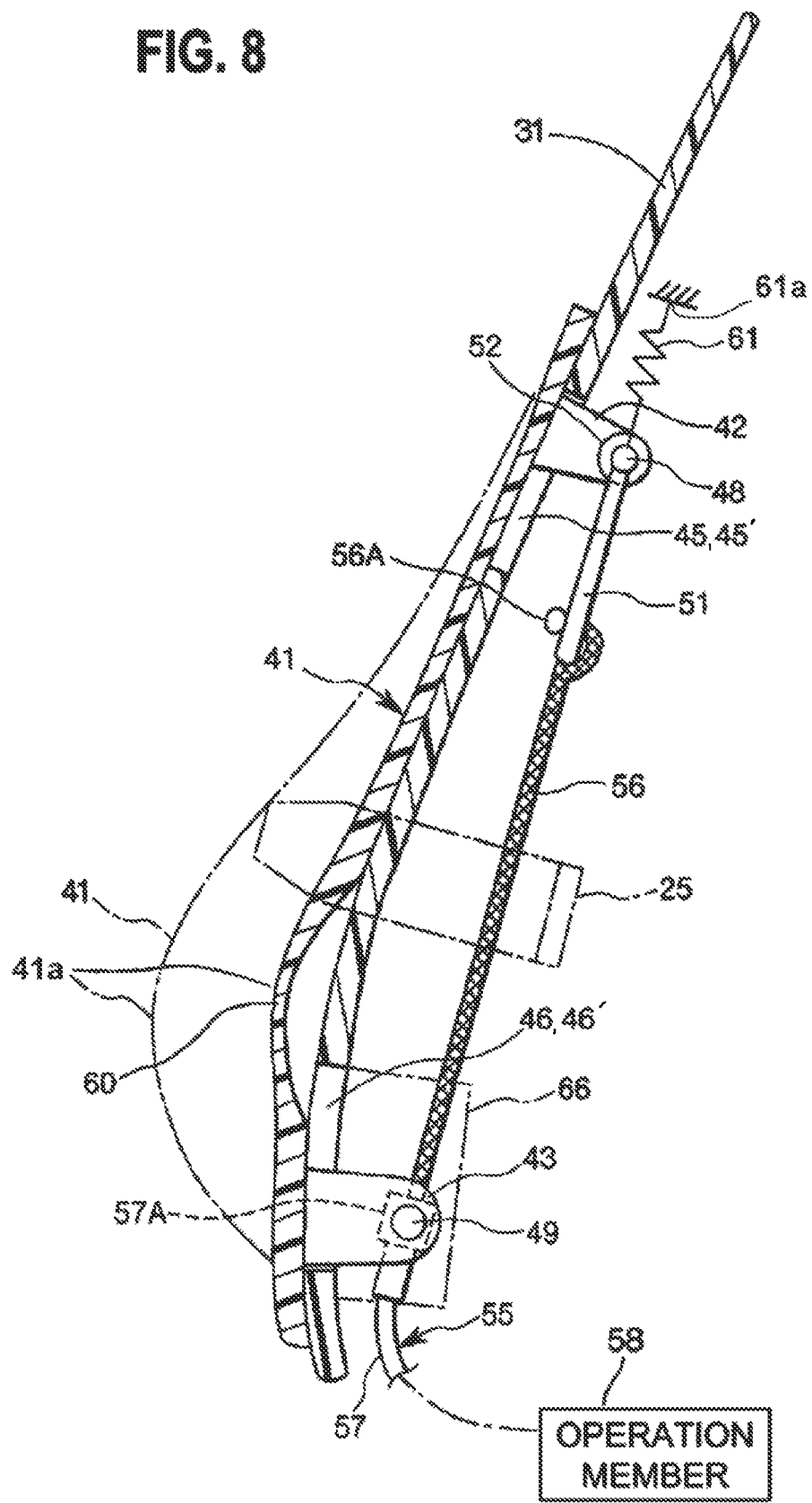
FIG. 8 is a longitudinal sectional view showing the cushion plate and the auxiliary plate.

An upper edge 34 of the flexible cushion plate 31, as shown in FIG. 7, is located somewhat higher than the ninth thoracic vertebra X of the seat occupant T of the average height. The center gravity of the upper body of the seat occupant T is positioned near the ninth thoracic vertebra X. The cushion plate 31 is able to effectively support a part around the center of gravity of the seat occupant T.

The upper seat spring 32A is selected to be at substantially the same height level as the ninth thoracic vertebra X or somewhat lower than it. In FIG. 7, the upper seat spring 32A is located somewhat lower than the ninth thoracic vertebra X. The reason for this is that a load of the upper part of the body to the seat back cushion 17 usually acts on the rearward side.

The flexible cushion plate 31 includes a lower part 33 for supporting a portion near the sacrum S of the pelvis. The lower part 33 enhances a holding property at a portion near the hip of the seat occupant T.

The vehicle rear-end collision detector 25 is located in the rear of the flexible cushion plate 31 in a state that a predetermined space is present therebetween. Since the cushion plate 31 takes a plate-like shape for broadly covering the back of the seat occupant T, the flexible cushion plate 31 receives a load of the seat occupant T on a wide area when a rear-end collision occurs, and moves rearwardly. The amount of a rearward movement of the flexible cushion plate 31 is the largest between a mid portion as vertically viewed and a portion somewhat lower than the mid position. Therefore, the collision detector 25 is preferably located at a mid position as vertically viewed or a position somewhat lower than the mid position in order to reliably receive the rearward movement of the cushion plate 31. Since a width of the seat back 2 as viewed in the front-and-back direction becomes narrower upward, it is not preferable that the collision detector 25 is located at an upper position on the rear side of the flexible cushion plate 31.

A flexible auxiliary plate 41 is provided between the flexible cushion plate 31 and the seat back cushion 17. Collectively, the flexible cushion plate 31 and auxiliary plate 41 may be construed as a load receiving member. The auxiliary plate 41 is preferably made of synthetic resin such as polypropylene, and is substantially a single rectangular plate, which is smaller than the flexible cushion plate 31. When the auxiliary plate 41 is operated by the seat occupant T, it is bent to the front and pushes the seat back cushion 17 forwardly, thereby adjusting a cushion pressure against the seat occupant T.

The auxiliary plate 41, which has a top portion (or a maximum forward curve portion) 41a, is provided with rearward projecting upper sliders 42 and lower sliders 43. The upper sliders 42 protrude in a rearward projecting portion 42a to the rear side of the flexible cushion plate 31 through vertical upper slits (first through-hole) 45, (second through-hole) 45' formed in the cushion plate 31. The lower sliders 43 protrude to the rear side of the cushion plate 31 through vertical lower slits (first through-hole) 46, (second through hole) 46' formed in the cushion plate 31. An upper horizontal mounting shaft 48 is bridged between the upper sliders 42 and 42, and a lower horizontal mounting shaft 49 is bridged between the lower sliders 43 and 43.

The auxiliary plate 41 is mounted to the cushion plate 31 by using the mounting shafts 48 and 49. The sliders 42 and 43 are vertically slidable in the slits 45 and 46, respectively. When the upper sliders 42 are moved downwardly and the lower sliders 43 are moved upwardly, the auxiliary plate 41 is bent to the front.

An upper U-shaped bracket 51 is rotatably mounted on the upper horizontal mounting shaft 48. The bracket 51 includes a pair of arms 52 mounted to the mounting shaft 48 and a coupling part 53 provided between the arms 52. A cable head 56A of an inner cable 56 of a wire cable 55 is placed on and secured to the coupling part 53. A lower bracket 66 is rotatably mounted to the lower horizontal mounting shaft 49. The lower bracket 66 includes a pair of arms 67 mounted to the mounting shaft 49 and a coupling part 68 provided between the arms 67. A tube head 57A of an outer tube 57 of the wire cable 55 is placed on and secured to the lower bracket 66. The other end of the wire cable 55 is coupled to an operation member 58 provided on the vehicle seat 1.

When the operation member 58 is operated, a distance between the cable head 56A and the tube head 57A, i.e., a distance between the upper sliders 42 and the lower sliders 43 is adjusted. When the distance becomes long, the auxiliary plate 41 is parallel to the flexible cushion plate 31, and when it becomes short, the auxiliary plate 41 bends to project to the front. Thus, by operating the operation member 58, a degree of bending (forward projecting quantity) of the auxiliary plate 41 can be adjusted.

The auxiliary plate 41 includes a thin part 60 for defining a curved shape of the auxiliary plate 41. When the distance between the upper sliders 42 and the lower sliders 43 becomes short, the auxiliary plate 41 is curved with respect to the thin part 60. Accordingly, the curved shape of the auxiliary plate 41 is kept in a predetermined shape, and the cushion pressure adjustment by the auxiliary plate 41 is made effective by setting the thin part 60 at the lumber part of the seat occupant T.

A spring 61, having an upper end attaching portion 61a for urging the upper horizontal mounting shaft 48 upwardly is provided between the upper horizontal mounting shaft 48 and the flexible cushion plate 31 (or the upper seat spring 32A).

The flexible cushion plate 31 bends under a load from the seat occupant T and moves rearward against the elasticity of the seat springs 32, and flexibly supports the seat occupant T. The flexible cushion plate 31 supports the seat back cushion 17 in "plane". Therefore, the cushion plate makes the seat occupant T feel more stable and comfortable than the conventional one in which the seat back cushion 17 is supported by only the seat springs 32.

When a physique of the seat occupant T presents an insufficient pressure from the seat back cushion 17, the seated person pulls the inner cable 56 by operating the operation member 58 to reduce the distance between the upper sliders 42 and the lower sliders 43. Then, the auxiliary plate 41 protrudes forward with respect to the thin part 60, pushes the seat back cushion 17 forward to increase the cushion pressure, whereby the cushion pressure is adjusted as the seat occupant T desires.

When the auxiliary plate 41 is curved by the operation member 58, the cushion pressure is changed. Since the auxiliary plate 41 and the flexible cushion plate 31 are in overlapping relation, the load by the seat occupant T that the auxiliary plate 41 receives is directly dispersed into the flexible cushion plate 31 as a single large plate. Accordingly, the good stability and comfort of the seat back cushion 17 are not lost.

When a rear-end collision occurs, the flexible cushion plate 31 greatly moves rearward by the load from the seat occupant T to come into contact with the vehicle rear-end collision detector 25 and to move it backward. In turn, the lower links 26, in FIG. 5, rotate counterclockwise to lower the coupling rod 20. The downward movement of the coupling rod 20 turns the upper links 15 counterclockwise to move the headrest support 10 to the front. As a result, the headrest 4 pushed to the front to protect the head (neck) of the seat occupant T against the impact by the rear-end collision.

In this case, the distance between the pin 29 and the shafts 28 is shorter than that between the pins 27 and the shafts 28. Accordingly, the lower links 26 efficiently transmits the rearward movement of the collision detector 25 to the coupling rod 20. Since the upper arms 22 of the upper links 15 are longer than the lower arms 23, the downward movement of the coupling rod 20 is efficiently transmitted to the headrest support 10. Therefore, the forward movement of the headrest 4 is satisfactorily secured.

Since the cushion plate 31 is shaped like a plate broadly covering the back of the seat occupant T, it reliably receives the rearward movement of the seat occupant T at the time of the rear-end collision in a broad area to reliably transmit the rearward movement of the seat occupant T to the collision detector 25.

When the auxiliary plate 41 is bent by the operation member 58, the cushion pressure is changed. Since the flexible cushion plate 31 is shaped like a plate broadly covering the back of the seat occupant T, and receives the load from the seat occupant T in a dispersing manner, the change of the cushion pressure by the auxiliary plate 41 does not substantially move the positions of the flexible cushion plate 31 and the collision detector 25. Accordingly, the relative position of the cushion plate 31 to the collision detector 25 is retained and the change of the cushion pressure by the auxiliary plate 41 does not substantially interfere with the function of the active headrest mechanism.

TABLE OF REFERENCE CHARACTERS

| | |
|---|---|
| 1 | vehicle seat |
| 2 | seat back |
| 3 | seat bottom |
| 4 | headrest |
| 5 | seat back frame |
| 6 | side frame |
| 6a, 6a' | wire spring engagement portions |
| 6b | side frame front projecting wall |
| 6c | side frame rear projecting wall |
| 6d | opening |
| 6e | inwardly protruding portion, side projecting portion |
| 6f | lateral face |
| 6g | concave (cutout) portion |
| 6h | inner end portion |
| 6i | support member attachment portion |
| 6j | first step portion |
| 6k | second step portion |
| 6m | lower side frame portion |
| 6" | second biasing member engagement portion |
| 7 | upper frame |
| 8 | lower frame |
| 8a | connecting plate |
| 8b | projecting curve portion |
| 9 | pillars |
| 10 | headrest support (also "lateral member" or "right-to-left extending member") |

TABLE OF REFERENCE CHARACTERS-continued

| | |
|---|---|
| 11 | vertical engaging parts, first and second pillar insertion portion |
| 12 | upper bracket |
| 13 | upper spring |
| 14 | lower spring (also "biasing member") |
| 15 | upper link (also "link member") |
| 15a | link support portion |
| 16 | link support shaft |
| 16a | first hole of upper link |
| 17 | cushion |
| 20 | longitudinally extending coupling rod (or "load transmission rod") |
| 21 | pin |
| 21a | second hole of upper link |
| 22 | upper link upper (second) long arm |
| 23 | upper link lower (first) short arm |
| 25 | rear-end collision detector, connecting plate member |
| 25a | contact portion |
| 25b | reinforcing portion (bead) |
| 25' | connecting member, extending portion of connecting plate member |
| 25'a | bend portion |
| 25'b | strengthening portion |
| 26 | lower link (also "link member") |
| 26' | first biasing member engagement portion |
| 27 | pin (also "swinging shaft" or "connecting shaft") |
| 28 | link support shaft |
| 29 | pin |
| 30 | flexible plate member |
| 31 | flexible cushion plate, resin plate member |
| 31a | mounting portion (also "wire engagement portion", "first wire coupling portion") |
| 31a' | mounting portion (also "wire engagement portion", "second wire coupling portion") |
| 31b | projecting portion |
| 31c | protruding portion |
| 31d | first plate portion |
| 31e | first contact portion |
| 31f | second contact portion |
| 31h | first wide portion |
| 31i | narrow portion |
| 31j | second wide portion |
| 32 | seat springs (coupling member) |
| 32A | upper seat spring, wire member, first wire member |
| 32B | lower seat spring, second wire member |
| 33 | lower part of flexible cushion plate |
| 34 | upper edge of flexible cushion plate |
| 35 | lower bracket |
| 35a | link shaft supporting face |
| 35b | first attachment portion |
| 35c | bracket attachment portion |
| 35d | second attachment portion |
| 36 | offset portion |
| 41 | flexible auxiliary plate, protruding curvature portion |
| 41a | top portion (maximum forward portion of a curve) of auxiliary plate |
| 42 | rearward projecting upper slider |
| 42a | rearward projection portion ("retainer") |
| 43 | lower slider |
| 45 | vertical upper slit, first through hole |
| 45' | vertical upper slit, second through hole |
| 46 | vertical lower slit, first through hole |
| 46' | vertical lower slit, second through hole |
| 48 | upper horizontal mounting shaft (also "linear member") |
| 49 | lower horizontal mounting shaft |
| 51 | upper U-shaped bracket |
| 52 | arms |
| 53 | coupling part |
| 55 | wire cable |
| 56 | inner cable |
| 56A | cable head |
| 57 | outer tube |
| 57A | tube head |
| 58 | operation member |
| 60 | auxiliary plate thin part |
| 61 | spring |
| 61a | spring upper end attaching portion |
| 66 | lower bracket |

-continued

TABLE OF REFERENCE CHARACTERS

| 67 | lower bracket arm |
| 68 | coupling part |
| T | occupant |

What is claimed is:

1. A method of assembling a vehicle seat, comprising:
providing a seat back frame that includes a pair of side frames and a lower frame connecting lower portions of the pair of side frames;
forwardly movably connecting a headrest for supporting a head of a seat occupant to the seat back frame;
mounting a rear-end collision detector to the seat back frame at a position behind the seat occupant, wherein the rear-end collision detector detects rearward movement of the seat occupant and is movable rearward;
operatively connecting the rear-end collision detector to the headrest such that the rearward movement of the rear-end collision detector forwardly moves the headrest;
disposing a link member at a position lateral to the rear-end collision detector;
mounting a bracket to a side frame of the pair of side frames that constitutes a side portion of the seat back frame;
mounting a link support shaft to the bracket, with the link member being mounted to the link support shaft;
forming a front extending portion that inwardly extends in a right-to-left direction and is formed at a front end of a lateral face of the side frame;
forming a rear extending portion that inwardly extends in the right-to-left direction and is formed at a rear end of the lateral face of the side frame;
providing a flexible plate member in front of the rear-end collision detector; and
coupling the flexible plate member to the seat back frame via a coupling member;
wherein:
at least a part of the bracket is disposed on the lateral face of the side frame and between the front extending portion and the rear extending portion;
a protruding portion inwardly protruding is integrally formed from a portion of the lateral face of the side frame that faces at least the part of the bracket;
at least the part of the bracket is directly attached to the integrally formed protruding portion;
the flexible plate member includes a first wide portion, a second wide portion that is provided at a different region in the flexible plate member than a region in the flexible plate member at which the first wide portion is provided, and a narrow portion that has a smaller width in the right-to-left direction than a width of the first wide portion;
the second wide portion is provided at a lower portion of the flexible plate member;
each of right and left side portions of the second wide portion obliquely extends downward and toward a center of the flexible plate member in the right-to-left direction, and a width of a lower portion of the second wide portion in the right-to-left direction becomes smaller as the lower portion of the second wide portion extends downward; and
at least a portion of the lower portion of the second wide portion that obliquely extends is arranged at a position that overlaps the lower frame of the seat back frame in a seat front-to-back direction.

2. The method according to claim 1, wherein:
the link member is swingably connected to an end of the rear-end collision detector through a connecting shaft; and
the connecting shaft is disposed at a position overlapping, in a right-to-left direction, with the protruding portion.

3. The method according to claim 2, wherein the connecting shaft is smaller in diameter than the link support shaft.

4. The method according to claim 1, further comprising:
providing the bracket with a link shaft supporting face that extends from a side frame side towards an inner side of the seat;
wherein:
the link shaft supporting face is disposed at a position overlapping, in a right-to-left direction, with the protruding portion.

5. The method according to claim 1, further comprising:
providing a headrest support for supporting the headrest that extends in a horizontal direction;
wherein:
the part of the bracket that is attached to the protruding portion is disposed below the headrest support and above a lower end portion of each side of the rear-end collision detector.

6. The method according to claim 1, further comprising:
providing a seat back cushion in front of the flexible plate member;
wherein:
the flexible plate member pressure-adjusts the seat back cushion by protruding forward and pushing the seat back cushion to a front direction by an operation of the seat occupant;
the flexible plate member is provided with a first plate portion disposed closer to a top of the seat than the rear-end collision detector; and
a region of the first plate portion positioned generally at the same height as the bracket is smaller in width than a region of the maximum width of the flexible plate member.

7. The method according to claim 6, further comprising:
positioning a maximum forward portion of a curve of the flexible plate member formed when the flexible plate member protrudes forward closer to a bottom of the seat than the rear-end collision detector.

8. The method according to claim 1, further comprising:
providing the protruding portion with a bracket attachment portion for attaching a part of the bracket; and
forming an opening on the protruding portion at a different height than the bracket attachment portion.

9. The method according to claim 1, further comprising:
providing the protruding portion with a bracket attachment portion for attaching a part of the bracket; and
forming an opening on the protruding portion above the bracket attachment portion.

10. The method according to claim 1, wherein the protruding portion has a planar portion that abuts at least two surfaces of the side frame.

11. A vehicle seat comprising:
a seat back frame that includes a pair of side frames and a lower frame connecting lower portions of the pair of side frames;
a headrest for supporting a head of a seat occupant, wherein the headrest is forwardly movably connected to the seat back frame;

a rear-end collision detector mounted to the seat back frame at a position behind the seat occupant, wherein the rear-end collision detector detects rearward movement of the seat occupant and moves rearward; and the rear-end collision detector is operatively connected to the headrest such that the rearward movement of the rear-end collision detector forwardly moves the headrest;

a link member disposed at a position lateral to the rear-end collision detector;

a bracket mounted to a side frame of the pair of side frames that constitutes a side portion of the seat back frame;

a link support shaft mounted to the bracket, wherein the link member is mounted to the link support shaft;

a front extending portion inwardly extending in a right-to-left direction and formed at a front end of a lateral face of the side frame;

a rear extending portion inwardly extending in the right-to-left direction and formed at a rear end of the lateral face of the side frame;

a flexible plate member provided in front of the rear-end collision detector; and a coupling member that couples the flexible plate member to the seat back frame;

wherein:

at least a part of the bracket is disposed on the lateral face of the side frame and between the front extending portion and the rear extending portion;

a protruding portion inwardly protruding is integrally formed from a portion of the lateral face of the side frame that faces at least the part of the bracket; and at least the part of the bracket is directly attached to the integrally formed protruding portion;

the flexible plate member includes a first wide portion, a second wide portion that is provided at a different region in the flexible plate member than a region in the flexible plate member at which the first wide portion is provided, and a narrow portion that has a smaller width in the right-to-left direction than a width of the first wide portion, the second wide portion is provided at a lower portion of the flexible plate member, each of right and left side portions of the second wide portion obliquely extends downward and toward a center of the flexible plate member in the right-to-left direction, and a width of a lower portion of the second wide portion in the right-to-left direction becomes smaller as the lower portion of the second wide portion extends downward, and at least a portion of the lower portion of the second wide portion that obliquely extends is arranged at a position that overlaps the lower frame of the seat back frame in a seat front-to-back direction.

* * * * *